United States Patent [19]
O'Brien et al.

[11] Patent Number: 5,140,133
[45] Date of Patent: Aug. 18, 1992

[54] ELECTRICAL IMPULSE HOT HOLE PUNCH FOR MAKING A TEAR-RESISTANT HOLE IN THERMOPLASTIC FILM

[75] Inventors: David W. O'Brien, North Ridgeville; Charles F. Rebhun, Austinburg; Zigmunt J. Walkiewicz, Jr., Chagrin Falls, all of Ohio

[73] Assignee: Clamco Corporation, Cleveland, Ohio

[21] Appl. No.: 435,604

[22] Filed: Nov. 13, 1989

[51] Int. Cl.⁵ .................. H05B 1/00; B26D 7/10; B26F 3/12
[52] U.S. Cl. .......................... 219/229; 83/16; 83/171; 156/515; 156/583.2; 219/233; 219/243
[58] Field of Search .......... 83/170, 171, 15, 16; 219/243, 233, 221, 227, 229; 156/583.2, 515

[56] References Cited
U.S. PATENT DOCUMENTS

| | | |
|---|---|---|
| 3,525,279 | 8/1970 | Christian . |
| 3,654,829 | 4/1972 | Anderson . |
| 3,687,789 | 8/1972 | Wheeler ............... 156/583.2 |
| 3,822,164 | 7/1974 | Guido et al. ............ 219/243 X |
| 3,876,858 | 4/1975 | Davis et al. . |
| 3,902,042 | 8/1975 | Goldfarb et al. . |
| 4,093,491 | 6/1978 | Whelpton et al. .......... 219/229 X |
| 4,414,872 | 11/1983 | Bard et al. ................ 83/171 |
| 4,449,434 | 5/1984 | Johnson . |

Primary Examiner—Anthony Bartis
Attorney, Agent, or Firm—Tarolli, Sundheim & Covell

[57] ABSTRACT

An electrical impulse hot hole punch apparatus is presented herein for making a tear-resistant hole in a sheet of thermoplastic film. The apparatus includes an electric heating element which is supported for selective reciprocal movement transverse to a sheet of film between a first position, remote from the film, and a film melt position at which the heating element is positioned proximate to the film. An impulse generating circuit is operative in response to the heating element being moved to its film melt position for purposes of supplying an electric current pulse to the heating element. The current pulse has a time duration on the order of one half cycle of an AC voltage pulse and is of a magnitude sufficient to heat the heating element to a temperature in excess of the melting point of the film.

16 Claims, 3 Drawing Sheets

ELECTRICAL IMPULSE HOT HOLE PUNCH FOR MAKING A TEAR-RESISTANT HOLE IN THERMOPLASTIC FILM

BACKGROUND OF THE INVENTION

This invention relates to wrapping objects with thermoplastic film, such as polyvinyl chloride wrapping film and, more particularly, to apparatus for making a tear-resistant hole in such film.

It is known in the art that items to be packaged are frequently surrounded and sealed in thin plastic film. The sealed item is subsequently placed in a heating device in order to shrink the film. Ideally, the film will closely conform to the shape of the item being packaged. In order for this to occur, air trapped within the sealed film enclosure must be given a way to escape. This is usually done by putting a small hole in the film prior to the sealing operation.

It has been known in the art to employ a mechanical punch for making a small hole in the film prior to the sealing operation. However, some films are prone to tearing at the hole due to the high tensile forces on the film during the shrinking operation. It is preferred to melt a hole in the film with a device which has been heated to a temperature sufficiently high to melt the film. This results in a hole having a peripheral edge which resolidifies into a beaded configuration which is not conducive to tearing. The problem, however, is that the temperature required to melt thermoplastic film is at a level on the order of 250° F. which may cause harm to an operator.

The D. K. Christian U.S. Pat. No. 3,525,279 discloses an electrically heated punch for providing a tear-resistant deflation hole in thermoplastic film so that air trapped by the film during wrapping may escape so as to thereby permit the film to shrink snugly around the article to be packaged. Christian's electrically heated punch is constantly maintained at a temperature above the melting point of the thermoplastic film and employs a film support plate acting as a heat sink and/or a fan for blowing air in an attempt to remove heat from the process. Still further, Christian provides no shielding for protecting an operator from being harmed by the electrically heated punch.

SUMMARY OF THE INVENTION

It is an object of the present invention to provide an electrically heated punch for making a tear-resistant hole in a sheet of thermoplastic film by supplying an electric pulse to an electric heating element sufficient to melt the film with the pulse duration being sufficiently short to maintain a relatively low operating temperature.

Moreover, it is an object of the present invention to provide such an apparatus which does not require the use of a heat sink or electric fan.

It is a still further object of the present invention to provide such an apparatus with a heat shield to prevent the operator from accidentally touching the heating element structure.

In accordance with the present invention, an electrical impulse hot hole punch is provided for making a tear-resistant hole in a sheet of thermoplastic film. The apparatus includes means for supporting the film. The heating element is mounted for reciprocal movement transverse to the film between a first position remote from the film, and a film melt position at which the element is positioned proximate to the film. When the heating element is in its film melt position, an electrical current pulse is supplied to the heating element. The current pulse is of sufficient magnitude that the heating element attains a temperature sufficient to melt the film, providing a tear-resistant hole therein.

BRIEF DESCRIPTION OF THE DRAWINGS

The foregoing and other objects and advantages of the invention will become more readily apparent from the following description of a preferred embodiment of the invention as taken in conjunction with the accompanying drawings which are a part hereof and wherein.

DESCRIPTION OF PREFERRED EMBODIMENT

Figure 1:
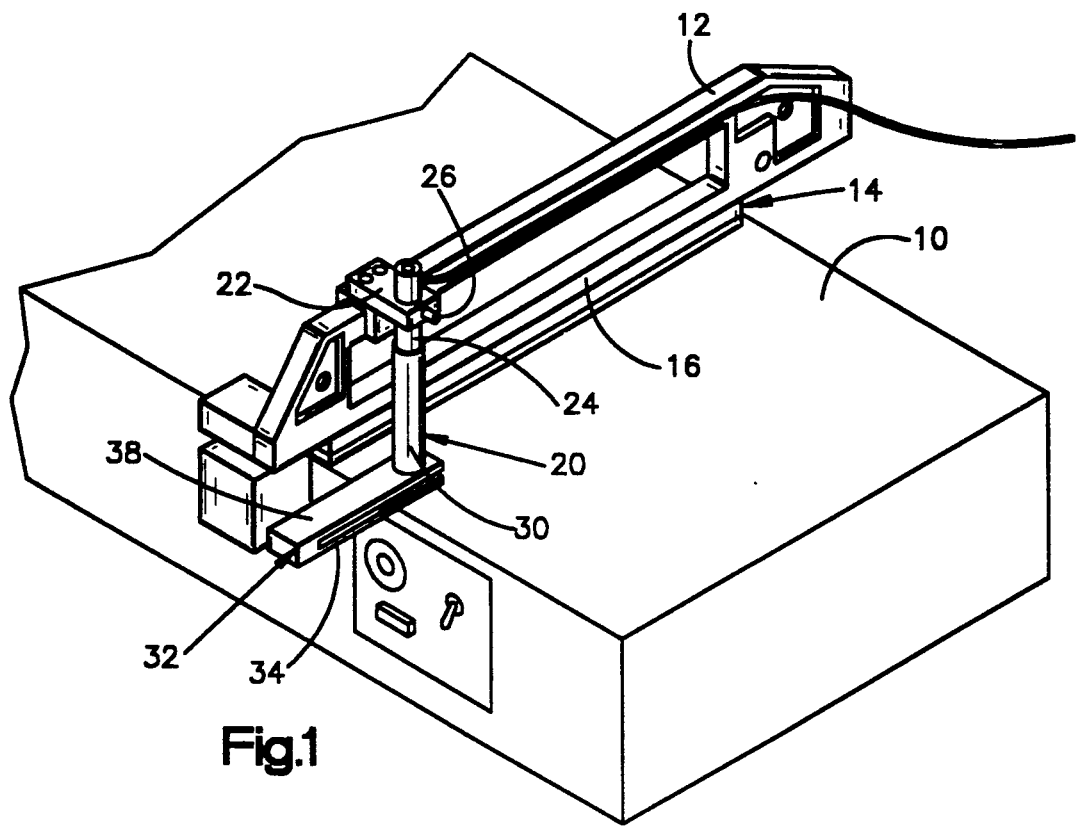
FIG. 1 is a fragmentary orthogonal view showing the improved electrical impulse hot hole punch mounted on a film wrap sealing arm.

Reference is now made to the drawings which are for purposes of illustrating a preferred embodiment of the invention only, and not for purposes of limiting same. FIG. 1 illustrates one application to which the present invention may be applied and takes the form of a wrapping machine including a work table 10 and a seal arm 12 pivotally mounted to the work table at a location 14. The seal arm 12 carries a sealing element located in a lower arm 16 which extends transversely across the work table 10 for use in sealing thermoplastic film in a known manner.

An electrical impulse hot hole punch 20, constructed in accordance with the present invention, may be attached to the seal arm 12 by means of a tube clamp 22 secured to the upper portion of the seal arm 12. The clamp 22 has a circular aperture therein for receiving the main tube 24 of the punch apparatus 20. The tube 24 is adjustably held in place by means of an adjustment knob 26 having a threaded portion threadably extending through a threaded hole in clamp 22 to securely engage an outer portion of main tube 24. A tubular heat shield 30 coaxially surrounds a portion of the length of main tube 24 and extends downwardly therefrom toward the upper surface of work table 10 on which there is secured a film splitter 32. The film splitter 32 is U-shaped in cross section and has a lower leg 34 secured to the work table 10, as by means of a screw 36, and an upper leg 38.

Figure 2:
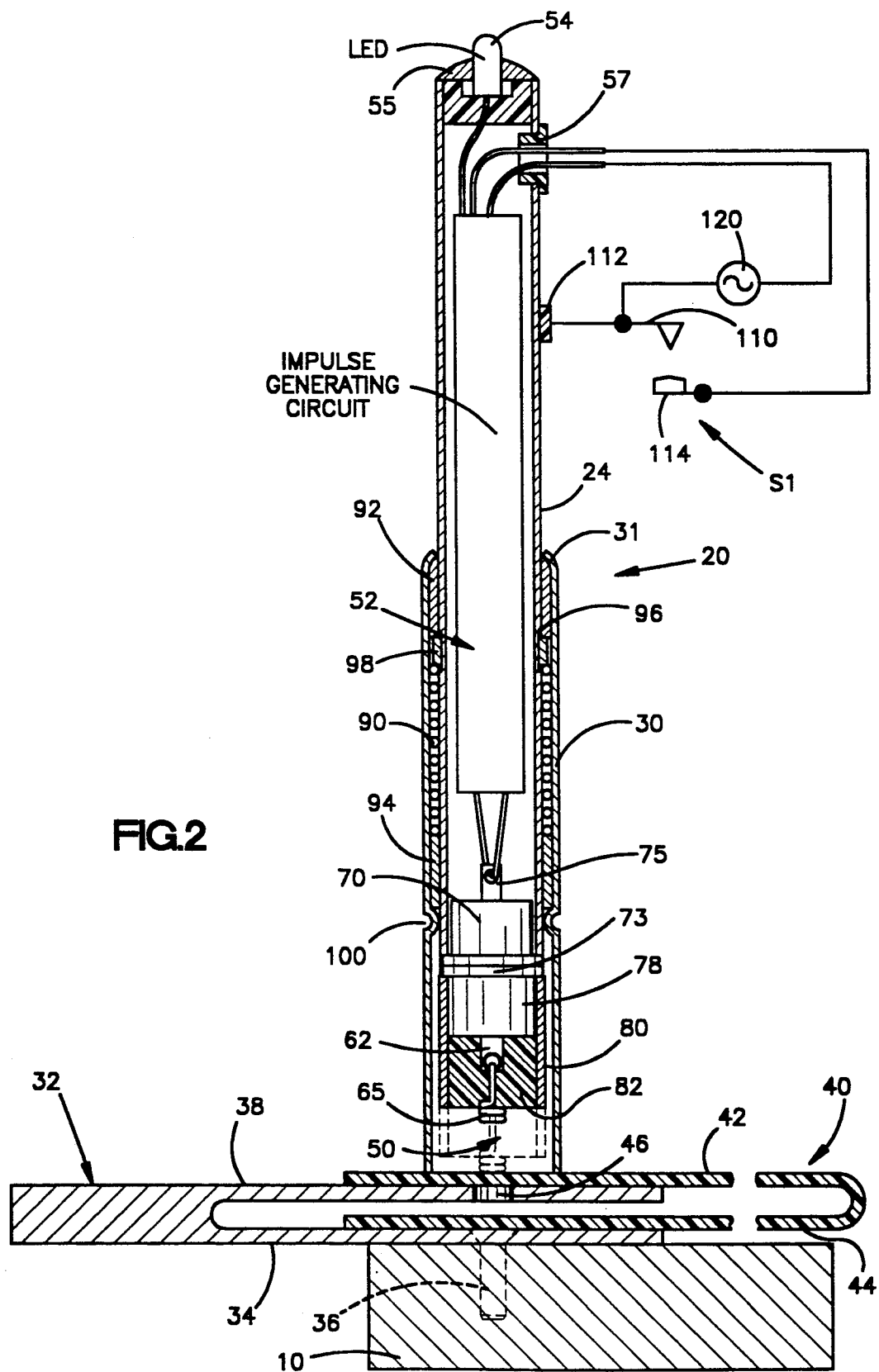
FIG. 2 is an enlarged sectional view of the electrical impulse hot hole punch of FIG. 1.

As best shown in FIG. 2, the film splitter 32 may split a folded film 40 into an upper film layer 42 and a lower film layer 44. The lower film layer 44 is disposed between legs 34 and 38 and is supported on the upper surface of leg 34. The upper film layer 42 is supported on the upper surface of leg 38. The film may be pulled or driven along the work table with the upper film layer 42 being slidably supported by the upper surface of leg 38 and the lower film layer 44 being slidably supported by the upper surface of splitter leg 34. The upper leg 38 is provided with a circular shaped aperture 46 which is in alignment with the coiled end of a heating element 50 carried by main tube 24 and which will be described in greater detail hereinafter. The aperture 46 is in registry with the coiled end and is of greater diameter so that during operation, the heating element may burn through film layer 42 and extend into the aperture 46 without touching the upper leg 38.

The main tube 24 and the tubular shield 30 may be constructed of metal, such as aluminum. The main tube 24 serves as a housing for carrying the heating element 50 and its associated impulse generating circuit 52 together with a light emitting diode 54 which produces a visual indication while a current pulse is supplied to the heating element for melting a hole in the thermoplastic film.

Figure 3:
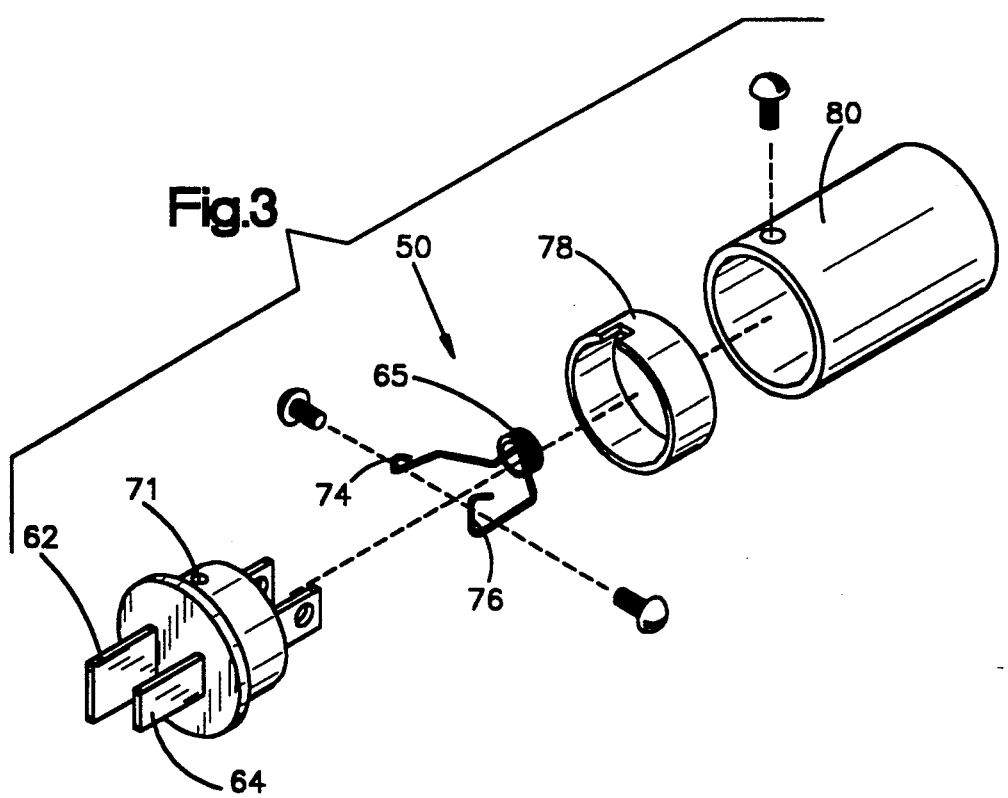
FIG. 3 is an exploded view illustrating various parts employed in conjunction with the heating element.

The heating element 50, as best shown in FIGS. 2 and 3, is carried by a plug 71 having a pair of plug terminals 62 and 64 which are received by an electrical socket 70 carried at the lower end of main tube 24. The electrical socket 70 has a pair of terminals 75 extending upwardly from the socket and which are electrically connected to the impulse generating circuit 52. Thus, the heater element plug may be removed from the main tube 24 and replaced, if need be.

The heating element 50 and plug 71 are shown in FIG. 3. The heating element 50 includes a high resistance wire having a coiled end 65 which may be obtained by winding 2.5 turns of the wire about a 0.125 inch diameter mandrel. The electrical plug terminals 62 and 64 extend through the plug 71 and are suitably secured to the ends 74 and 76 of the high resistance heating element wire, as by soldering or by such fastening means as nuts and screws. The plug 71 is constructed of electrical insulating material. A sleeve 78 extends over the plug 71 and this assembly is surrounded by a plug casing 80. Plug 71 has a radially outwardly extending rim 73 at its upper end, as viewed in FIG. 2. Approximately one and one-half turns of the heating element coil extend beyond the end of plug casing 80, as is best shown in FIG. 2. Once assembled, the plug casing 80 is filled with thermal insulating potting compound 82. This configuration results in resistive load on the order of 0.259 ohms.

The main tube 24 also serves as a housing for the impulse generating circuitry 52 and carries, at its upper end, the light emitting diode 54. This diode is supported by an end cap 55 secured to the top end of the main tube 24. The light emitting diode is energized while a heating current pulse is applied to the heating element 50 to alert an operator of this condition.

The main tube 24 also has an insulated bushing 57 extending through the tube to provide access for electrical wiring extending into the tube for connection with the impulse generating circuit 52.

The tubular shield 30 surrounds a portion of the lower length of the main tube 24 and normally extends beyond the heating element 50 in the manner shown in FIG. 2. A coil spring 90 coaxially surrounds a portion of the length of main tube 24 intermediate the main tube and the tubular shield 30. This spring resiliently urges the shield 30 toward its extended position, as shown by the solid lines in FIG. 2. The main tube 24 may be displaced in a downward direction against the spring force so that the heating element 50 may be displaced from a remote position to a film melt position and engage the film 42.

Spring 90 is located between annular tube guides 92 and 94. The upper end 31 of the tubular shield 30 is spun over in an inward direction to retain the annular guide 92 in place. An annular recess 96 is provided in the outer surface of main tube 24, intermediate guide 92 and the upper end of spring 90, for carrying a split collar 98 having an outer diameter greater than that of the main tube 24. Collar 98 is split so that it can be spread apart and slid over the main tube and snapped onto the recess 96. Collar 98 serves to engage the upper end of spring 90 when the main tube 24 is driven in a downward direction so that the tube is displaced downwardly against the resilient force of the spring. The tubular shield 30 is provided with a groove 100 that necks inwardly just below guide 94 to prevent the guide from being displaced downwardly by spring 90 when the main tube 24 is pressed in a downward direction.

It is contemplated that the hot impulse punch 20 may be mounted on the sealing arm 20 of a film sealer by means of the main tube clamp 22. The punch position is adjusted with adjustment knob 26 so that when the sealing arm is lowered to a location as shown in FIG. 1, the lower end of the tubular shield 30 will engage film layer 42 and hold it down against the upper leg 38 of the film splitter 32. As the sealing arm is pressed fully down, it will displace the main tube 24 in a downward direction against the resilient force of spring 90 so that the coiled end 65 of the heating element will engage film 42 and burn a hole therethrough.

As the main tube 24 is being displaced downwardly against the resilient force of the spring 90, a switch S1 closes to actuate the impulse generation circuit 52. This is schematically illustrated in FIG. 2 with a switch arm 110 mounted to an insulator 112 carried by tube 24. When the switch arm 110 contacts a stationary switch arm 114, a circuit is completed with a suitable AC voltage source 120 to energize the impulse generating circuit 52 which supplies a current pulse to the heating element 50. This current pulse may be on the order of 300 amperes and have a duration on the order of one-half cycle of the alternating voltage source. This is sufficient to heat the heating element to a temperature substantially greater than the melting point of the film. This may be on the order of 800° F. to 1,000° F. This results in a melted hole in the film with the periphery of the hole being beaded somewhat to present a tear-resistant hole which will not progress under normal tension applied to the film during a wrapping and shrinking operation. The remaining heat in the element is gradually dissipated into the surrounding casing by way of the thermal insulation 82 in the plug casing 80 and then dissipated to the atmosphere.

During this operation of making a hole in the film, the shield 30 serves to hold the layer of film 42 downwardly against the upper leg 38 of the film splitter to prevent movement of the film during the hole making operation. Additionally, the shield serves to prevent injury to the operator as it prevents the operator from accidentally touching the heating element 50 and its surrounding plug casing 80. The operation is maintained at a relatively cool temperature since the impulse duration is short, on the order of 0.008 seconds, and the circuitry 52, to be described in greater detail below, maintains a minimum time duration between impulses of approximately two seconds. Consequently, the temperature level of the exposed shield 30 does not rise to a level which might be uncomfortable or dangerous to the operator.

Impulse Generating Circuit

The impulse generating circuit 52 and its manner of operation will now be described with reference to FIG.

Figure 5:
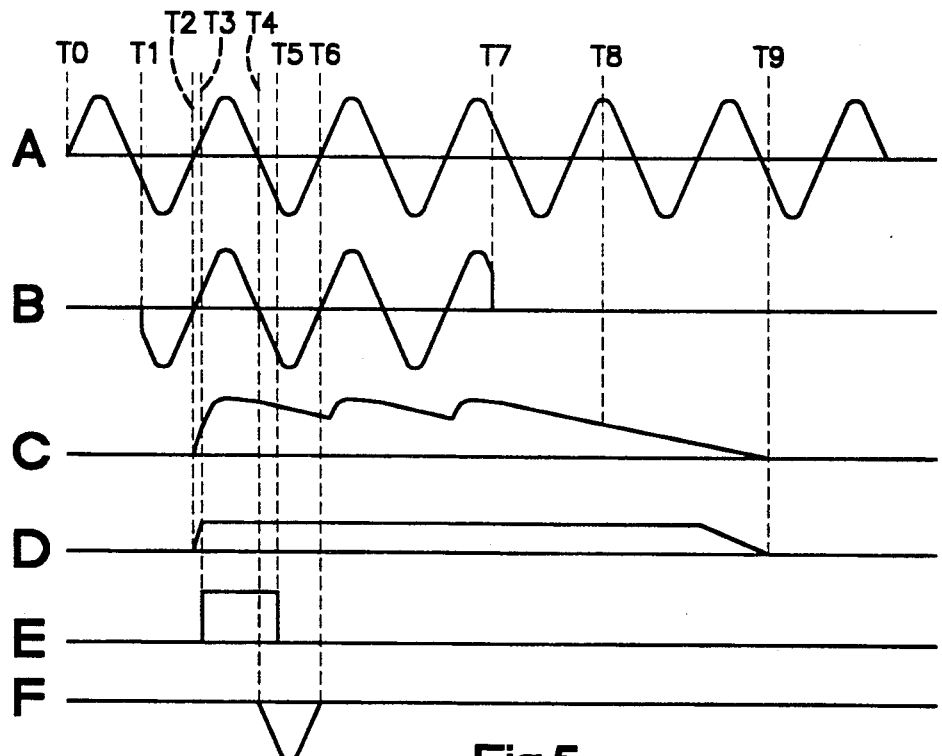
FIG. 5 presents waveforms A-F showing voltage or current with respect to time and is useful in understanding the operation of the circuitry of FIG. 4.

4 and the waveforms of FIG. 5. The impulse generating circuit 52 is preferably mounted on a printed circuit board contained within the main tube 24. With the main power switch S2 closed, no current will flow through the heating element 50 until a silicon control rectifier (SCR) 122 is gated into conduction by the impulse generating circuit 52. When the silicon control rectifier is gated into conduction, a single pulse of current on the order of 300 amperes will flow through the heating element 50 for a time duration corresponding with one-half cycle of the alternating current voltage source 120. The impulse generating circuit 52 becomes operative upon closure of switch S1, when the seal arm 12 is moved downwardly sufficient that electrical contacts 110 and 114 (FIG. 2) close. The circuit 52 will provide a current pulse for the heating element 50 and also operates to prevent a second pulse from occurring for a time delay which is preferably on the order of two seconds.

The SCR 122 is gated into conduction by a zero crossing driver circuit 124. This driver circuit may be obtained from Motorola Inc. under Model No. MOC3060. A positive gating signal from the driver circuit 124 is applied through a diode 126 and a resistor 128 to gate the SCR 122 on which will then pass current during the next negative half-cycle of the input AC voltage source and will terminate passing current on the next negative-to-positive zero crossing transition after the positive gating signal has been removed.

The driver circuit 124 provides the positive gating signal to the gate of the SCR 122 after its input circuit has received a positive signal from a timer circuit 130. The driver circuit 124 responds to an applied positive input signal to produce a positive gating signal for the gate of the SCR 122 during the: next positive-to-negative zero crossing transition of the AC source.

The postive signal provided by timer circuit 130 is supplied to the input of driver circuit 124 by way of the light emitting diode 54 and a resistor 132. This energizes the light emitting diode 54 to provide a visual indication to the operator that the heating element 50 is being energized. The timing circuit 130 operates in conjunction with a series circuit including diode 140, resistor 142 and capacitor 144 to perform the timing function. Thus, when an input voltage is supplied to the input of the timer circuit, at pins 4 and 8, the timer circuit provides a positive trigger pulse at its output pin 3, as illustrated by waveform E in FIG. 5. In the meantime, current flows through diode 140 and resistor 142 to charge capacitor 144. When the voltage across the capacitor 144 attains a level of approximately 67% of the voltage applied to the input of the timer circuit 130, the trigger pulse is terminated, as seen by waveform E in FIG. 5. The time duration of this trigger pulse is determined by the RC time constant of resistor 142 and capacitor 144. Preferably the trigger pulse duration is on the order of 0.011 seconds. Capacitor 143 serves as a filter. The timer circuit 130 may be obtained from General Electric Corp. under Model No. LM555. The resistor 142 may have a value of 100 kilo-ohms and capacitor 144 may have a value of 0.1 microfarad.

Upon closure of switch S1, voltage is supplied to the impulse generating circuit 52 and current flows through a diode 150 to charge a capacitor 152 toward that of the voltage supply source. This is illustrated by waveform C in FIG. 5. A zener diode 154 is connected across the capacitor 152 by way of a resistor 156 and serves to maintain the input voltage to the timer circuit 130 at a maximum voltage on the order of 12 volts. This is illustrated by the waveform D in FIG. 5.

The typical duration of switch closure is on the order of two seconds, as indicated by the time duration from T1 through T7 in FIG. 5. When the switch is opened, the capacitor 152 discharges through a resistor 160 to thereby remove the voltage supplied to the timer circuit 130 before starting the next cycle of operation.

The resistor 160 may have a value on the order of 22 kilo ohms and the capacitor 152 may have a value on the order of 100 microfarads. With these values, the discharge of the capacitor is such that the repetition rate of the trigger pulses is limited to approximately 40 pulses per minute.

Figure 4:
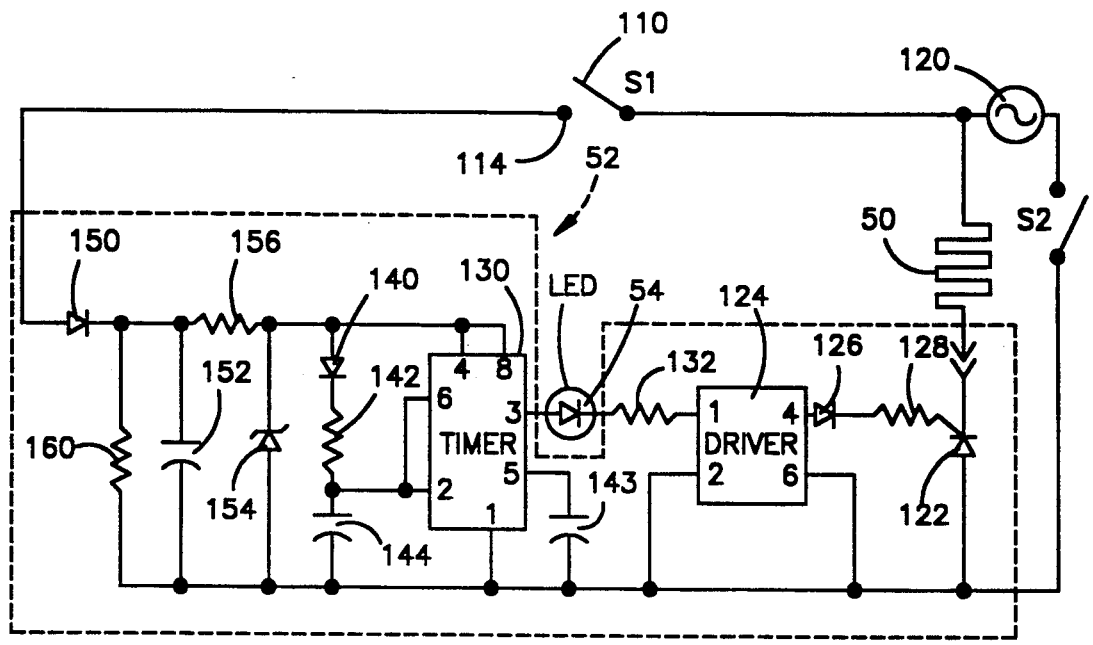
FIG. 4 is a schematic-block diagram illustration of electrical circuitry employed in the invention.

The operation of the impulse generating circuit 52 may be better appreciated from the waveforms of FIG. 5. Note that from time T0 through time T7, all of the waveforms are of the same time scale. Time T1 through time T7 represents the film sealing time, during which switch S1 (FIG. 4) is closed.

At time T0, switch S2 (FIG. 4) is closed to provide power to the circuitry and drive voltage is applied to the SCR 122. The SCR does not conduct at this time. At time T1, the operation commences upon closure of switch S1 and voltage is supplied to the impulse generating circuit 52, as is seen in the waveform B of FIG. 5. When the applied voltage next has a negative-to-positive zero crossing transition at time T2, the capacitor 152 charges toward the peak value of the applied voltage through the rectifying diode 150 (see waveform C in FIG. 5). The voltage across zener diode 154 also starts to increase in a positive direction at time T2, as is seen from waveform D in FIG. 5. At time T3, the timer circuit 130 provides a positive output signal, as seen in waveform E in FIG. 5. This triggers the drive circuit 124 and capacitor 144 charges toward 67% of the applied voltage. At time T4, the drive voltage for the SCR 122 has a positive-to-negative zero crossing transition and since a positive gating signal is applied at this time, the SCR is gated into conduction and a current pulse, as indicated by waveform F in FIG. 5, is supplied to the heating element 50.

At time T5, the voltage across capacitor 144 has attained a value of 67% of the applied voltage (12 volts) and the timer trigger pulse is terminated (see waveform E in FIG. 5). At time T6, the SCR drive voltage has a negative-to-positive zero crossing transition. Since the gate signal has been removed, the SCR 122 turns off and current no longer flows through the heating element 50.

It will be noted from waveform D in FIG. 5 that at time T3 the input voltage attained a level corresponding with the regulating voltage of the zener diode 154. The zener diode prevents any further increase in the voltage supplied to the timer circuit 130. This continues so long as the voltage across capacitor 152 remains above the regulating level of the zener diode, thereby preventing retriggering of the timer.

At time T7, switch S1 opens, removing input voltage from the impulse generating circuit 52. As seen in waveform C of FIG. 5, capacitor 152 now discharges through resistor 160 and the capacitor voltage decays from time T7 through time T9. When the voltage drops below the minimum operating voltage of the timer circuit 130, the timer circuit is reset and capacitor 144 discharges through internal circuitry of the timer. In this case the minimum operating voltage is 5 volts. The timer cannot be restarted to provide a positive output trigger signal at pin 3 unless it has been previously reset by decreasing the voltage applied to pins 4 and 8 below the minimum operating voltage of 5 volts. At time T9, the impulse cycle can be repeated.

If the trigger supply voltage is reapplied, by closure of switch S1, at time T8, the capacitor 152 will recharge toward the peak value of the input voltage. However, the timer circuit 130 will not retrigger to provide a positive output trigger signal because it had not been previously reset. That is, the voltage did not drop below the minimum operating voltage of the timer after switch S1 was previously opened. This prevents unwanted impulse generation due to relay contact bounce, line transients, seal heater temperature compensation, and the like.

Although the invention has been described in conjunction with a preferred embodiment, various modifications may be made without departing from the spirit and scope of the invention as defined by the appended claims.

Having described a specific preferred embodiment of the invention, the following is claimed:

1. An electrical impulse hot hole punch apparatus for making a tear-resistant hole in a sheet of thermoplastic film, comprising:
   film support means for supporting a sheet of said film;
   an electric heating element;
   mounting means carrying said heating element for reciprocal movement transverse to said film between a normal first position, remote from said film, and a film melt position at which said element is positioned proximate to said film;
   means for selectively moving said mounting means and said heating element to obtain said reciprocal movement of said heating element;
   impulse circuit means for, when actuated, supplying a single electric current pulse to said heating element with the magnitude of said current pulse being sufficient for heating said heating element to a temperature in excess of the melting point of said film and wherein said pulse has a time duration on the order of one half cycle of an AC voltage source; and,
   actuating means responsive to said reciprocal movement of said heating element for actuating said impulse circuit means for supplying said current pulse to said heating element only upon said heating element being moved to said film melt position.

2. Apparatus as set forth in claim 1 wherein said mounting means includes an elongated mounting member, said heating element being mounted to one end of said mounting member.

3. Apparatus as set forth in claim 2, including means for removably securing said heating element to said one end of said mounting member.

4. Apparatus as set forth in claim 3, wherein said removable securing means includes a plug and socket arrangement.

5. An electrical impulse hot hole punch apparatus for making a tear-resistant hole in a sheet of thermoplastic film, comprising:
   film support means for supporting a sheet of said film;
   an electric heating element;
   mounting means carrying said heating element for reciprocal movement transverse to said film between a normal first position, remote from said film, and a film melt position at which said element is positioned proximate to said film;
   means for moving said mounting means and said heating element to obtain said reciprocal movement;
   impulse circuit means for, when actuated, supplying an electric current pulse to said heating element for heating said heating element to a temperature in excess of the melting point of said film;
   said mounting means includes an elongated mounting member, said heating element being mounted to one end of said mounting member;
   actuating mean responsive to said movement of said heating element for actuating said impulse circuit means for supplying said current pulse to said heating element only upon said heating element being in said film melt position; and,
   an elongated hollow housing having first and second ends, said housing surrounding and slidably receiving a portion of the length of said mounting member along with said heating element such that said housing has an extended position and a retracted position relative to said heating element, said housing having a said extended position when said heating element is in said first position, whereupon said first end of said housing extends beyond said heating element for engaging and holding the sheet of film against said film support means, and said housing having a said film melt position, whereupon said housing surrounds said heating element to present a heat shield therefore.

6. Apparatus as set forth in claim 5, including resilient means interposed between said housing and said mounting member for resiliently biasing said housing so as to normally be in its said extended position relative to that of said heating element.

7. Apparatus as set forth in claim 6, wherein said elongated mounting member is circular in cross-section, and said housing is tubular in cross-section, and wherein said resilient means includes a coiled spring surrounding a portion of the length of said mounting member.

8. Apparatus as set forth in claim 6, wherein said mounting member is an elongated hollow tube having a first end and a second end, said heating element being removably mounted to said first end of said tube.

9. Apparatus as set forth in claim 8, including a plug and a socket arrangement interposed between said first end of said tube and said heating element for removably mounting said heating element to said tube.

10. Apparatus as set forth in claim 8, wherein said impulse circuit means is mounted within said tube intermediate the first and second ends thereof.

11. Apparatus as set forth in claim 8, including visual indicating means mounted to said second end of said tube for supplying a visual indication when said impulse circuit means supplies a said current pulse to said heating element.

12. An electrical impulse hot hole punch apparatus for making a tear-resistant hole in a sheet of thermoplastic film, comprising:
   film support means for supporting a sheet of said film;
   an electric heating element;
   mounting means carrying said heating element for reciprocal movement transverse to said film between a normal first position, remote from said film, and a film melt position at which said element is positioned proximate to said film;
   means for moving said mounting means and said heating element to obtain said reciprocal movement;
   impulse circuit means for, when actuated, supplying an electric current pulse to said heating element with the magnitude of said current pulse being sufficient for heating said heating element to a temperature in excess of the melting point of said film; and turn on switching means responsive to said movement of said heating element for actuating said impulse circuit means for supplying said electric current pulse to said heating element only upon said heating element being in said film melt position.

13. Apparatus as set forth in claim 12, wherein said impulse circuit means includes uni-directional switching means for, when actuated, connecting an AC voltage source across said heating element such that current of only one polarity may flow through said heating element, and control means for actuating said uni-directional switching means in such a manner that it is actuated to conduct current for only ½ cycle of said AC voltage source.

14. Apparatus as set forth in claim 13, wherein said uni-directional switching means includes an SCR having a gate for receiving a gating signal, said control means supplying a said gating signal to said gate for actuating said SCR to conduct current during the next negative half-cycle of said AC voltage source.

15. Apparatus as set forth in claim 14, wherein said control means includes circuit means operative in response to actuation of said turn on switching means for supplying said gating signal for a predetermined time duration sufficient that said SCR conducts current only during the next negative half-cycle of said AC voltage source.

16. Apparatus as set forth in claim 15, wherein said circuit means includes timing means for timing said predetermined time duration commencing only after the next negative-to-positive zero crossing transition of said AC voltage source after actuation of said turn on switching means.

* * * * *